Figure 1:
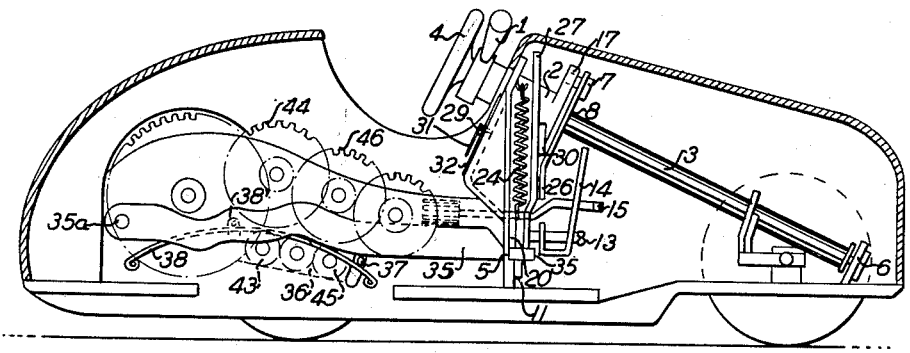

Dec. 21, 1954   H. MÜLLER   2,697,305
MOTOR-DRIVEN TOY VEHICLE
Filed April 2, 1951   3 Sheets-Sheet 1

INVENTOR
HEINRICH MULLER
BY
ATTORNEYS

Dec. 21, 1954     H. MÜLLER     2,697,305
MOTOR-DRIVEN TOY VEHICLE

Filed April 2, 1951     3 Sheets-Sheet 2

INVENTOR
HEINRICH MULLER

BY *Young, Emery + Thompson*
ATTORNEYS

Dec. 21, 1954  H. MÜLLER  2,697,305
MOTOR-DRIVEN TOY VEHICLE
Filed April 2, 1951  3 Sheets-Sheet 3

INVENTOR
HEINRICH MULLER
BY Young, Emery & Thompson
ATTORNEY

United States Patent Office 2,697,305
Patented Dec. 21, 1954

2,697,305
MOTOR-DRIVEN TOY VEHICLE

Heinrich Müller, Nurnberg, Germany

Application April 2, 1951, Serial No. 218,809

Claims priority, application Germany November 11, 1950

1 Claim. (Cl. 46—206)

The invention relates to toy vehicles driven by a running gear or spring motor, such as toy motor cars, provided with shifting means for speed changing or for changing the driving direction or both for changing the speed as well as the driving direction.

According to the invention a hand shifting lever is provided consisting of a handle radially projecting from the shaft of the steering wheel, said hand shifting lever being rockable in opposite directions as well as displaceable along said shaft by means of a guiding sleeve. The hand shifting lever together with its guiding sleeve may be displaced along the shaft of said sleeve and rotated in opposite directions preferably so that, in its initial axial position it may rotate into two lateral positions corresponding to two directions of travel e. g. the starting gear ahead running and the astern running, in its other axial end position however the two lateral positions of the lever correspond to two forward speeds, e. g. to the second and the third gear, while the middle position in both axial positions of the said lever corresponds to idle running.

According to a further feature of the invention the shifting lever or its guiding sleeve actuates, on the one hand, a leverage by means of an eccentric, said leverage serving for changing the speed e. g. by adjusting a regulating pendulum; on the other hand, the shifting lever or its guiding sleeve may control rods adjusting in a manner known per se the adjusting lever causing the engagement of toothed wheels for ahead and astern running or the disengagement of said toothed wheels for idle running.

The invention has the advantage that, in simulation of a real vehicle, the hand shifting lever is arranged on the shaft of the steering wheel whereby said hand shifting lever may be manipulated within the region of the steering wheel, and that the mentioned lever is guided when actuated in an H-shaped movement to that corresponding to a normal motor car, the said lever is always passed through the idle running position when changing the speed. The toy vehicle according to the invention has, therefore, besides its playing effect also a teaching effect thereby that the playing child learns to actuate the gear shifting of a motor car correctly so that, when shifting from one speed to another, always the idle position of the gearing is to be passed.

Suitably one arm of the leverage actuated by the guiding sleeve is eccentrically and rockably arranged on the said guiding sleeve while another arm of this leverage adjusts the regulating pendulum and is pivotally connected theeron whereby the speed is adjusted. The guiding sleeve acts by means of cam tracks on a rocking lever actuating the lever effecting the engagement of the toothed wheels for ahead or astern running or the disengagement of said toothed wheels for idle running. Two cam tracks may be provided at the guiding sleeve of the shifting lever, said tracks running across the axial direction of the sleeve and determining the different positions of the rocking lever coacting with said tracks by means of a cam. The two cam tracks are separated from each other by a wall provided at its middle with a recess through which the cam of the rocking lever may pass during the axial displacing of the guide sleeve provided that idle running position is adjusted. In that way the shifting lever is H-like guided, as mentioned above, when being shifted. A return spring returns the rocking lever into its initial position as well as presses its cam always against the cam tracks whereby the advantage is attained that the cam is only slidably pressed against the respective cam track in each shifting position but is also positively arrested if it is adjusted to the idle running position. By notches provided on the guiding sleeve e. g. on its cam tracks the guiding sleeve and the rocking lever may be secured in their different positions.

Further advantages and features of the invention are described in the following specification and illustrated by the accompanying drawings showing the invention partially schematically by way of example.

Figure 2:
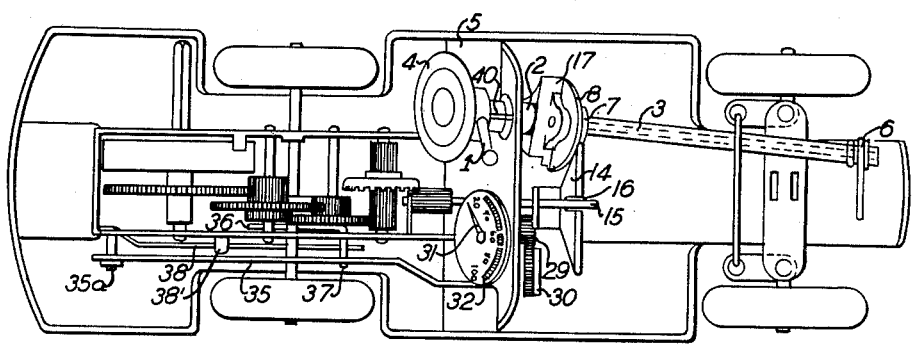
Figure 3:
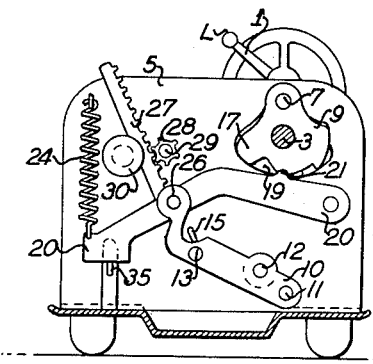
Figure 4:
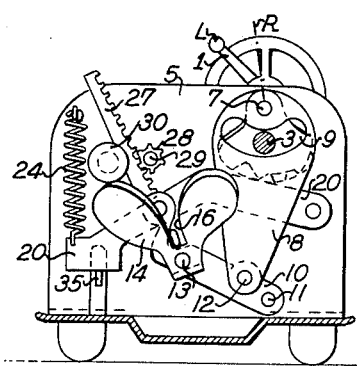
Figure 5:
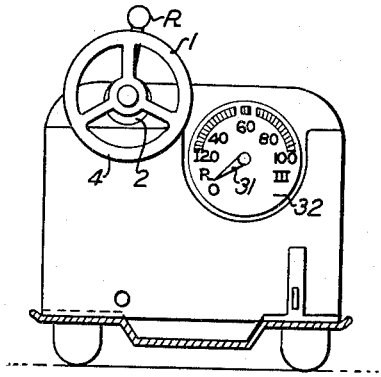
Figure 15:
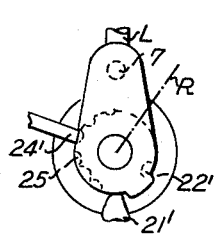
Figure 14:
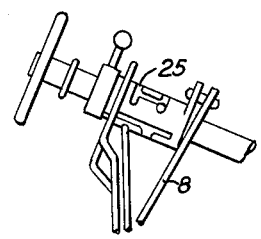
Figure 6:
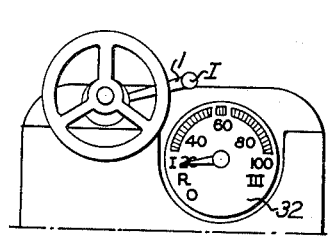
Figure 7:
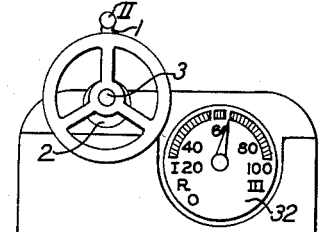
Figure 8:
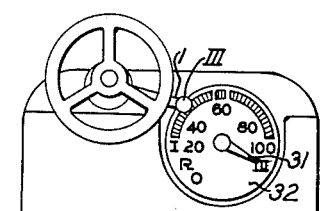
Figure 16:
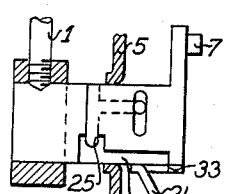
Figure 17:
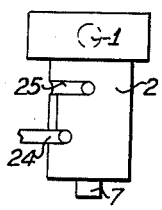
Figure 19:
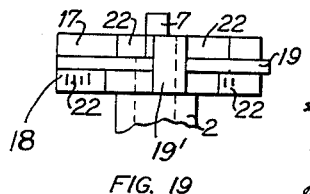
Figure 22:
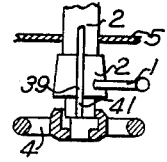
Figure 20:
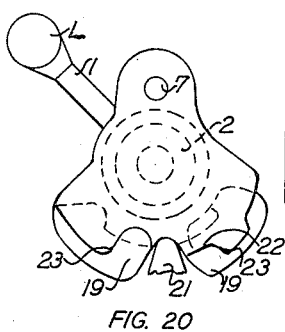
Figure 21:
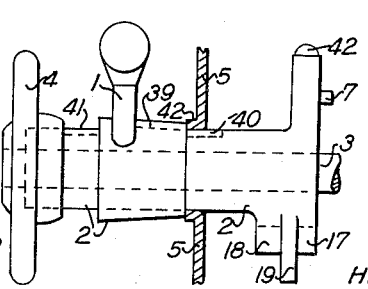
Figure 9:
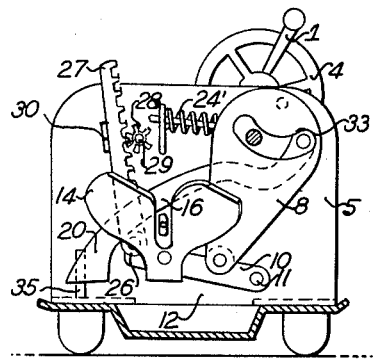
Figure 10:
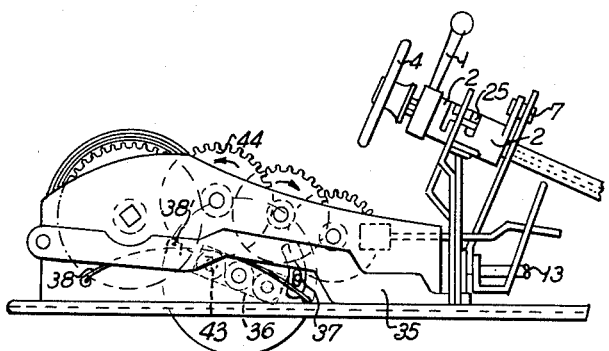
Figure 11:
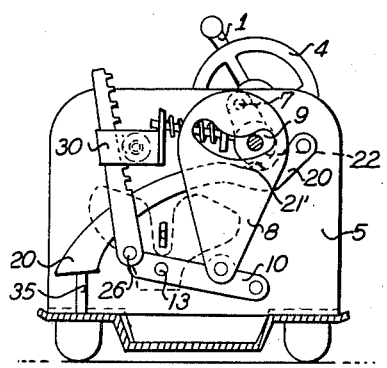
Figure 12:
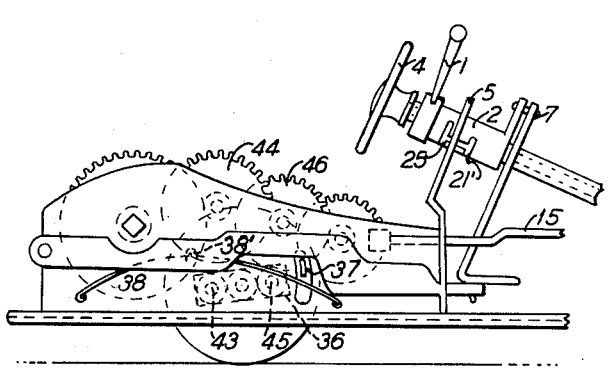
Figure 13:
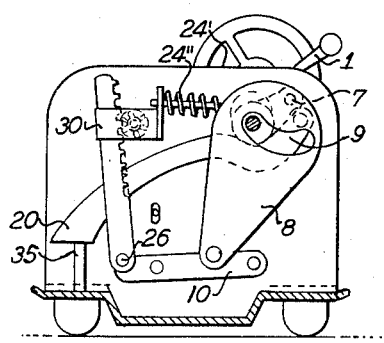
Figure 18:
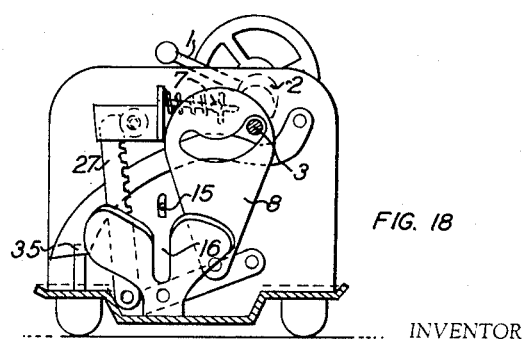

Fig. 1 is a longitudinal section through a toy motor car, the shifting elements being illustrated in a side view, Fig. 2 is a plan view of Fig. 1 the casing of the toy vehicle being removed, Fig. 3 is a front view of the wall supporting the shaft of the steering wheel, Fig. 4 is a similar view showing the regulating pendulum, Fig. 5 is a rear view of the supporting wall, the hand shifting lever being adjusted to astern running, Fig. 6 is a similar rear view, the hand shifting lever being adjusted to the starting gear ahead running, Fig. 7 is a similar rear view, the hand shifting lever being adjusted to the second gear ahead running, Fig. 8 is a similar rear view, the hand shifting lever being adjusted to the third gear ahead running, Fig. 9 is a front view of the supporting wall of another embodiment of the invention, the hand shifting lever being adjusted to astern running, Fig. 10 is a side view thereof the lever adjusting the toothed wheels being adjusted to astern running, Fig. 11 is a front view of the supporting wall of still another embodiment of the invention, the hand shifting lever being adjusted to the starting gear ahead running, Fig. 12 is another side view, the lever for adjusting the toothed wheels being adjusted to ahead running, Fig. 13 is a front view the hand shifting lever being adjusted to the second gear ahead running, Fig. 14 is a side view of the axis of the steering wheel with the guiding sleeve, Fig. 15 is a front view thereto, Fig. 16 shows a side view of the guiding sleeve in an enlarged scale, Fig. 17 is a plan view of the guiding sleeve in an enlarged scale, Fig. 18 is a front view of the supporting wall the hand shifting lever being adjusted to the third gear ahead running, Fig. 19 is a plan view of the guiding sleeve with the cam tracks in an enlarged scale, Fig. 20 is a front view of the guiding sleeve with the cam tracks in an enlarged scale, Fig. 21 is a side view thereto and Fig. 22 is a plan view of Fig. 20 in a smaller scale.

A hand shifting lever 1 with a guiding sleeve 2 is arranged on a shaft 3 of a steering wheel 4 and may, therefore, be handled in the reach of the steering wheel. The shaft 3 is solidly supported on the one hand by a wall 5 by means of the sleeve 2 and on the other hand by a bearing 6.

The guiding sleeve is displaceable on the shaft 3 in the axial direction as well as is rotatable around said shaft in opposite directions. The hand shifting lever 1 provided thereon is handle-like shaped and extends in the radial direction.

According to the embodiment shown in Figs. 1–8 and 19–22 a lever 8 is eccentrically pivoted to the guiding sleeve 2 by means of a pivot 7, said lever being pivotally connected with an arm 10 by means of a pin 12, which arm is pivoted by a pin 11 to the body of the vehicle. The lever 8 is passed by the shaft 3 of the steering wheel and is provided for this purpose with an elongated opening 9. To the free end of the arm 10 a regulating pendulum 14 is pivoted by a pivot 13, said pendulum being provided with a slot 16 and coacting in a manner known per se with a regulating crank 15 the shaft of which is driven by a spring motor. The more the pendulum 14 enters the region within which the crank 15 moves the slower the spring motor runs down, while the greatest running down speed results if the pendulum does not engage the crank 15.

To the free end of the arm 10 a rack 27 is pivoted meshing with a pinion 28 attached to a shaft 29. The rack 27 moves to and fro and simultaneously makes a rocking movement guided by a guiding element such as a roller 30. At the opposite side of the supporting wall 5 a hand 31 is attached to the shaft 29, said hand being part of an indicating device 32 provided with marks indicating the different speeds of idle running, the astern running and the ahead running position. In the embodiment shown in the drawings the reference figures O, R, I, II and III indicate these positions. Alternatively the dial of the indicating device may be provided with marks indicating the travelling speed in miles per hour. As is to be seen from Figs. 5–8, the velocity marks are preferably so chosen that the speed indicating number adjacent the respective gear indication corresponds about to the travelling velocity with which a real technical original motor car would run if the respective gear were selected.

As already mentioned the guiding sleeve 2 also operates the shifting from ahead running to astern running and vice versa, and for adjusting idle running. For this purpose a rocking lever 20 is provided with a cam 21 adapted to selectively coact with cam tracks 17 and 18 provided on the guiding sleeve 2. These tracks are separated from each other by a radially projecting wall or leg 19 so that undesired sliding over of the cam 21 from one track to the other is positively prevented. The wall 19, however, is interrupted near about its middle so that the cam 21 may pass through a gap or recess 19' formed thereby if said cam is to be brought from the one cam track to the other. For this purpose it is only necessary to shift the guiding sleeve 2 carrying the cam tracks in its axial direction. The said gap is arranged so that longitudinal shifting of the sleeve 2 is only possible when adjusted to idle running.

If the rocking lever 20 which is influenced by a return spring 24 is rocked downwardly it presses onto the front end of a lever 35 pivoted to the frame of the vehicle by means of a bolt 35a. The lever 35 thereby lowers an arm 37 of a wheel carrier 36, by engaging its forwardly bent over portion. The arm 37 is returned to its initial position by a spring 38. Consequently corresponding to the position of the rocking lever 20 a toothed wheel 43 meshes with a gear wheel 44 (Fig. 10) so that the vehicle runs rearwardly or a toothed wheel 45 engages a toothed wheel 46 (Fig. 12) so that the vehicle runs forwardly. In the intermediate position, neither the wheel 43 nor the wheel 45 meshes with a corresponding wheel and the idle running position is obtained. The return spring 24 simultaneously secures returning of the rocking lever 20 into its upper initial position and holds the cam 21 always in sliding contact with the cam tracks even if the toothed wheels 43, 44 or 45, 46 respectively should not disengage automatically.

The cam tracks are suitably provided with grooves 22 checking the guiding sleeve 2 and the rocking lever 20 in the selected positions. The cam 21 of the rocking lever 20 is pressed into these grooves by the action of the spring 24. Besides, abutments 23 are provided engaging the cam 21 of the rocking lever 20 if the guiding sleeve 2 rotates to and fro thereby limiting the rocking movement of the hand shifting lever 1.

In the embodiment according to Figs. 1 to 8 and 19 to 22 respectively the position L of the hand shifting lever 1 shown in Fig. 3 corresponds to the idle running position. In this position the running down of the spring motor is prevented by the pendulum. If the hand shifting lever 1 is brought into the position R according to Fig. 5 the toothed wheels 43 and 44 mesh with each other as soon as the rocking lever 20 is moved by the respective cam track. Simultaneously the arm 10 is rocked e. g. the position of the pendulum 14 is changed so that the spring motor runs down somewhat faster and, the rack 27 is shifted thereby causing the hand 31 to advance from "O" to "R." When shifting to the ahead starting gear (Fig. 4) the hand shifting lever 1 must pass the idle running position. The corresponding movement of the rocking lever 20 causes the engagement of the wheels 45 and 46. The regulating pendulum is further displaced by the arm 10 so that the spring motor runs down somewhat faster. The hand 31 has been moved by the rack 27 from "R" to "I." For shifting to the second gear the hand shifting lever 1 is first brought into the idle running position "L" and is then axially shifted with the sleeve 2 on the shaft 3 the cam 21 hereby passing through the gap in the wall 19 and being caused to coact with the other cam track 17. After the longitudinal movement is finished the hand shifting lever 1 is rocked into the position II according to Fig. 7 the second gear is adjusted, the engagement of the wheels 45, 46 being maintained, while the pendulum 14 releases the crank 15 still further so that the spring motor may run down still faster. Simultaneously the hand 31 has moved from "I" to "II." When adjusting the third gear according to Fig. 8 the hand shifting lever 1 is to be moved again over the idle running position to the other side around the shaft 3, whereby the pendulum 14 entirely releases the crank 15 thereby adjusting the fastest running down of the spring motor and therefore the highest traveling velocity. The hand 31 has then the position indicated by "III." The idle running position of the guiding sleeve 2 is made readily visible to the child by the adjustment of the indicating marks 39, 40 and 41 on the guiding sleeve 2 and by a countermark 42 on the supporting wall 5. Only when these marks are aligned can the idle running positions be obtained.

The embodiment according to Figs. 9–18 differs from the embodiment described above preferably thereby that the H-like guiding of the shifting lever 1 and its guiding sleeve 2 is done by means of another controlling means. In this case the sleeve 2 is provided with a H-like recess or opening 25 engaged by a pin 24' being under the action of a spring 24" and arranged on the supporting wall 5. The cam 21' of the rocking lever 20 may jump into recesses 22' of the guiding sleeve 2. The astern running and the idle running are controlled by a nose 33 coacting with the cam 21' when the sleeve 2 is correspondingly shifted in the longitudinal direction.

While in the embodiment first described the hand shifting lever has an inclined position in the idle running position (Fig. 3) it may also be arranged nearly vertically as to be seen in the embodiment shown in Figs. 9–18.

Of course the invention may also be used if the spring motor is not controlled by a pendulum but in any other way, e. g. by toothed gears, a friction gear or the like. In this case the arm 10 of the leverage brakes or releases the respective controlling device.

Having thus particularly described the nature of my said invention and the manner in what the same is to be performed what I wish to have covered by Letters Patent is:

In a toy vehicle having a body with front and rear wheels, a driving motor supported by said body and having means connecting said rear wheels thereto, a steering rod provided with a steering wheel and supported by said body and in operative connection with said front wheels, and shiftable gearing connected to the driving motor and having an intermediate position for idle running and two additional positions of which one is for forward running and the other for backward running; controlling means for the vehicle comprising a guide sleeve mounted on said steering rod so as to be capable of being axially shifted on and to be rotated around said rod, a manually operable lever in the form of a handle provided on and extending radially from said sleeve, a rocking lever with a cam pivotally mounted at one end on the body and controlled by the rotary movement of said sleeve by means of the cam, said lever being operatively associated with the shiftable gearing, cam tracks provided on said guide sleeve to contact the cam on the rocking lever, said cam tracks being arranged at right angles relative to the rotary axis of the sleeve and formed so as to determine the position of the rocking lever and to thereby determine the direction of travel of the vehicle, and a wall separating said cam tracks and provided with a recess near its mid portion, said cam on the rocking lever sliding along said wall upon rotary movement of the sleeve and being adapted to pass through said recess upon axial movement of the sleeve while said shiftable gearing is in idle position to provide thereby an H-shaped shifting movement of the said shifting lever.

References Cited in the file of this patent

UNITED STATES PATENTS

| Number | Name | Date |
| --- | --- | --- |
| 1,425,227 | Woodward | Aug. 8, 1922 |
| 2,257,064 | Muller | Sept. 23, 1941 |
| 2,407,840 | Leonard | Sept. 17, 1946 |
| 2,460,695 | Hennessy | Feb. 1, 1949 |